United States Patent [19]

Key

[11] 3,972,145

[45] Aug. 3, 1976

[54] MINNOW BUCKET WITH WATER AERATING MEANS

[76] Inventor: James A. Key, 812 Hanover, Weatherford, Tex. 76086

[22] Filed: Feb. 6, 1975

[21] Appl. No.: 547,748

[52] U.S. Cl. .................................................. 43/57
[51] Int. Cl.² ........................................ A01K 97/04
[58] Field of Search ........................................ 43/57

[56] References Cited
UNITED STATES PATENTS

| | | | |
|---|---|---|---|
| 1,604,971 | 11/1926 | Churchill et al. | 43/57 |
| 2,736,983 | 3/1956 | Hostetter | 43/57 |
| 2,782,552 | 2/1957 | Adams et al. | 43/57 |

Primary Examiner—Warner H. Camp
Attorney, Agent, or Firm—Clarence A. O'Brien; Harvey B. Jacobson

[57] ABSTRACT

An upstanding generally cylindrical body is provided and includes upper and lower vertically spaced closure walls extending and sealingly secured across the lower end portion of the body. An upwardly opening water receptacle is defined above the upper closure wall and a closed airtight chamber is defined within the body between the upper and lower closure walls. A tubular valve body is supported from and opens through the upper closure wall and has a valve element shiftably supported from the valve body for movement between open and closed positions. A support member is threadedly engaged with the end of the sleeve opening upwardly through the upper closure wall and includes an abutment portion selectively engageable with the valve element to variably displace the latter away from a closed position toward an open position for variably controlling the venting of air from the airtight chamber through the tubular valve body into the receptacle and aerating water disposed therein. Further, means is provided operative to introduce air under pressure into the airtight chamber defined between the upper and lower closure walls.

2 Claims, 4 Drawing Figures

MINNOW BUCKET WITH WATER AERATING MEANS

BACKGROUND OF THE INVENTION

Various forms of minnow buckets and the like have been heretofore provided with means capable of aerating the water within the minnow bucket. However, some of these previous water aerating minnow buckets have included hand air pumps which must be operated manually or by means of a driving motor substantially continuously during the period that air under pressure is discharged into a lower portion of the minnow bucket. Further, some forms of aerating minnow buckets include hand pumps which are disposed substantially entirely exteriorly of the minnow bucket and which are therefore subject to damage by impact with adjacent objects. Still further, other forms of aerating minnow buckets include complicated and expensive airflow control valves for controlling the flow of air from a compressed air chamber into the bottom of the minnow bucket.

Examples of various forms of aerating minnow buckets of the type above described are disclosed in U.S. Pat. Nos. 299,765, 1,604,971, 1,731,921, 2,550,533 and 3,217,444.

BRIEF DESCRIPTION OF THE INVENTION

The minnow bucket of the instant invention includes a pair of vertically spaced bottom walls between which an airtight pressure chamber is defined and selectively usable means in the form of a check valve equipped air inlet and a hand-operable hand pump having an outlet opening into the air chamber are provided on the bucket whereby air under pressure may be introduced into the air chamber. Further, a tubular valve body communicates the interior of the air chamber with the interior of the bucket disposed immediately above the air chamber and the valve body is equipped with a longitudinally reciprocal valve element shiftable between open and closed positions. A support member is threadedly engaged with the end of the valve body opening into the inerior of the bucket above the air chamber and includes an abutment selectively engageable with the valve element to variably displace the latter away from a closed position toward an open position and to thereby control the venting of air from the air chamber into the interior of the minnow bucket disposed thereabove. Further, the upper end of the minnow bucket includes a stationary partial top wall through which an upstanding operating rod is rotatably received and the lower end of the operating rod is attached to the support member threadedly engaged with the tubular valve body whereby threaded adjustment of the support member, and thus the abutment carried thereby, may be effected from above the stationary top wall of the minnow bucket.

The main object of this invention is to provide a minnow bucket which will be capable of storing a reasonably large quantity of air under pressure within an air storage chamber and to also provide means whereby air under pressure within the air storage chamber may be variably vented therefrom into the interior of the bottom of the minnow bucket.

Another object of this invention, in accordance with the immediately preceding object, is to provide a minnow bucket having selectively operable means for introducing air under pressure into the airtight pressure chamber.

Another important object of this invention is to provide a minnow bucket including a readily operable infinitely variable control for selectively varying the rate at which air under pressure may be vented from the air pressure chamber into the bottom of the bucket.

A final object of this invention to be specifically enumerated herein is to provide a minnow bucket in acccordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
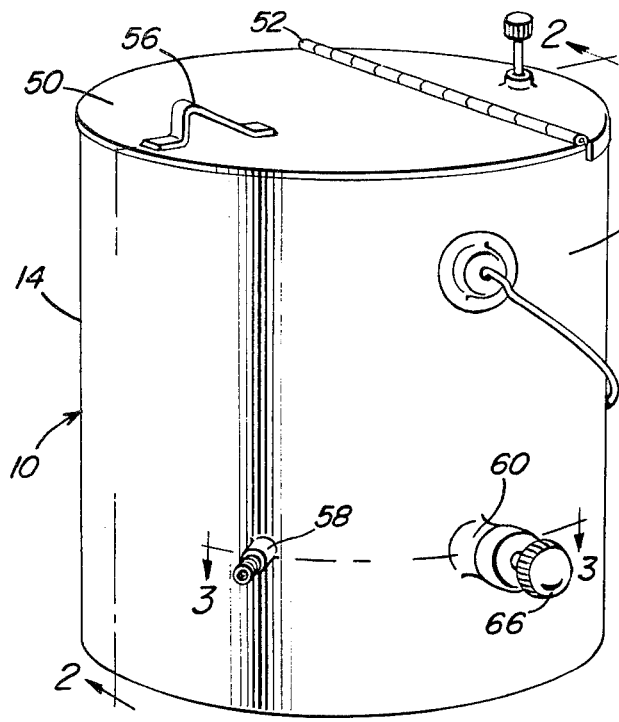
FIG. 1 is a perspective view of a preferred form of minnow bucket constructed in accordance with the present invention.

Referring now more specifically to the drawings, the numeral 10 generally designates the minnow bucket of the instant invention. The bucket 10 includes a substantially cylindrical body 12 including peripherally continuous upstanding side wall portions 14. The lower marginal portions of the side wall portions 14 include an inwardly directed upturned reinforcing bead 16 and a first lower bottom wall 18 is sealingly secured across the lower end of the body 12 at a point spaced above the lower marginal edges of the side wall portions 14. The bottom wall 18 is generally conical in configuration and opens upwardly.

The bucket 10 also includes an upper downwardly opening conical bottom wall 20 spaced above the bottom wall 18 and which is also sealingly secured across the interior of the body 12.

A substantially vertically disposed tubular valve body 22 is sealingly secured through an opening 24 formed in one outer marginal portion of the bottom wall 20 and the upper end of the tubular valve body 22 is both internally and externally threaded. A valve assembly 26 is threadedly secured within the upper end of the valve body 22 and includes a vertically reciprocal valve stem 28 having a valve head 30 on its lower end movable into and out of position closing the lower end of the valve sleeve 32 from which the stem 28 is reciprocally supported and comprising the body of the valve assembly 26. When the valve stem 28 is upwardly displaced with the head 30 abutted with the lower end of the valve sleeve 32, the valve assembly 26 is closed. However, when the valve stem 28 is displaced downwardly to unseat the head 30 from the lower end of the valve sleeve 32, the valve assembly 28 is open and air from within the air pressure chamber 34 disposed between the bottom walls 18 and 20 is vented through the valve sleeve 32 and outwardly from the upper end of the valve body 22.

Figure 4:
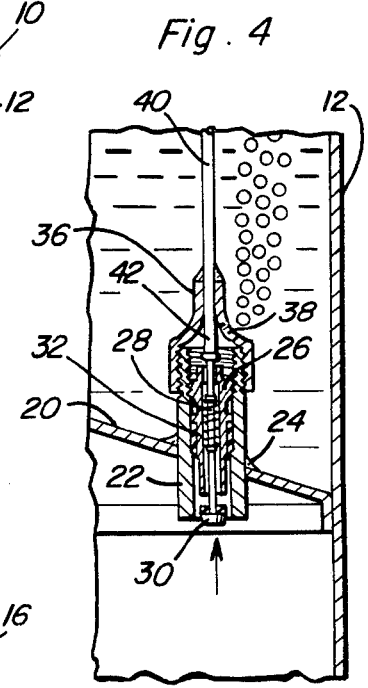
FIG. 4 is an enlarged fragmentary vertical sectional view illustrating in greater detail the structural features of the air venting valve of the minnow bucket.

However, a tubular support member 36 is provided and defines an internally threaded and downwardly opening cap which is internally threaded and is threaded onto the exterior of the upper end of the valve body 24. The cap 36 has an upper opening 38 therein and the lower end portion of a vertical operating rod 40 is secured downwardly through the center of the cap 36 and includes a lower end extension 42 defining an abutment engageable with the valve stem 28 upon downward threaded movement of the cap 36 on the valve body 22 to downwardly displace the valve stem 28 from its closed position toward the open position thereof illustrated in FIG. 4. The upper end of the operating rod 40 is rotatably received through an opening 44 formed in a stationary partial top wall 46 secured across the upper end of the body 12, the upper end of the rod 40 including an operating knob 48.

In addition to the partial top wall 46, a second partial top wall 50 is provided and has one marginal edge portion hingedly supported from the partial top wall 46 by means of a hinge asembly 52. The top wall portion 50 is swingable into and out of a position coacting with the partial top wall 46 to substantially fully close the upper end of the body 12. Further, the partial top wall 50 includes a spring catch 54 frictionally engageable with an upper reinforcing bead 55 of the body 12 corresponding to the bead 16. The clip 54 serves to frictionally retain the partial top wall 50 in a closed position and the free swinging edge portion of the partial top wall 50 includes a strap-type handle 56 supported therefrom on the upper surface thereof whereby the handle 56 may be readily manually grasped in order to swing the partial top wall 50 from the closed position thereof illustrated in FIG. 1 to an open position.

Figure 3:
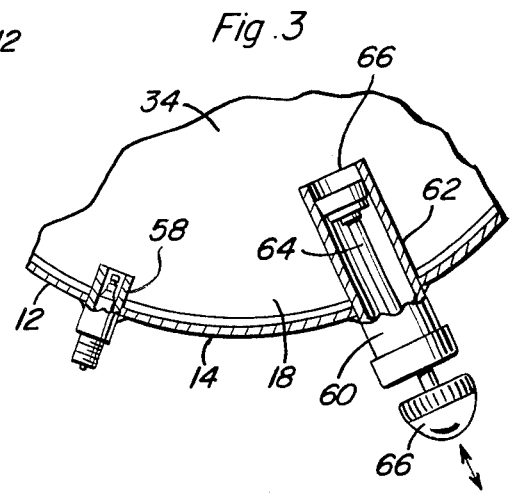
FIG. 3 is an enlarged fragmentary horizontal sectional view taken substantially upon the plane indicated by the section line 3—3 of FIG. 1.
Figure 2:
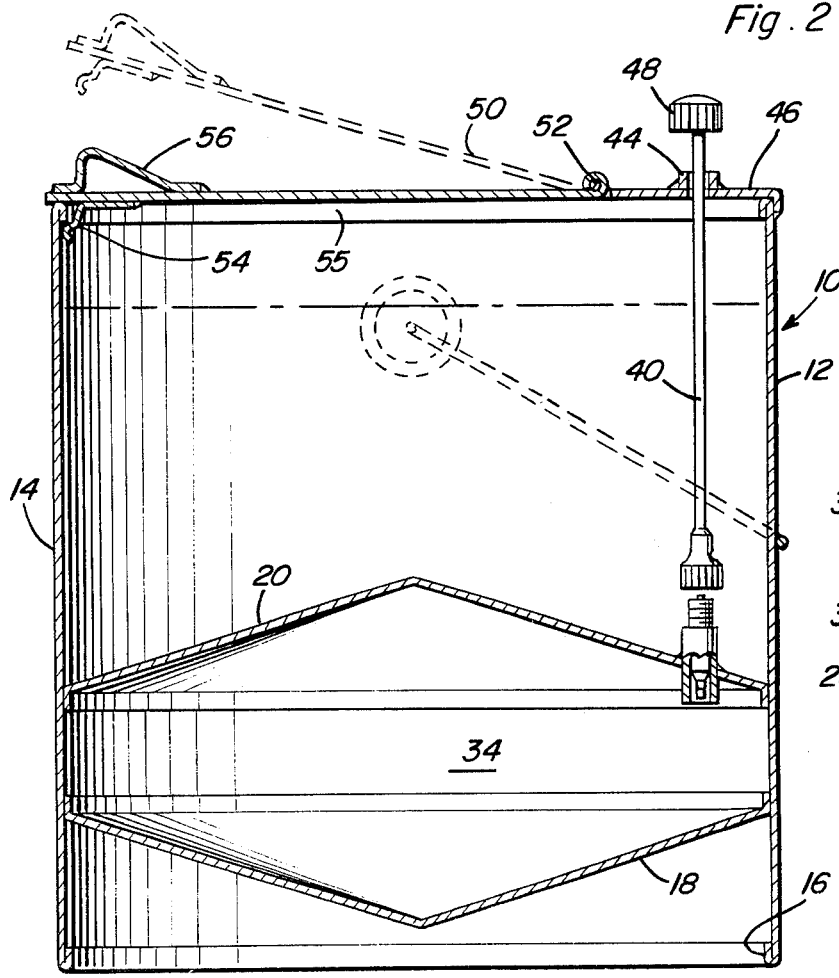
FIG. 2 is an enlarged fragmentary vertical sectional view taken substantially upon the plane indicated by the section line 2—2 of FIG. 1.

With attention now invited more specifically to FIGS. 1 and 3 of the drawings, it will be seen that a check valve equipped air inlet fitting 58 is secured through one side wall portion 14 of the body 12 whereby the chuck of an air pressure hose may be be operatively engaged with the fitting 58 in order to introduce air under pressure into the air chamber 34. In addition, an elongated air pump 60 has its tubular body portion 62 secured radially through the side wall portion 14 and includes a longitudinally reciprocal piston rod portion 64 having a handle 66 mounted on its outer end operable from the exterior of the body 12. The inner end of the tubular body 62 being provided with a check valve assembly 66 of conventional design opening into the chamber 34. Therefore, the minnow bucket 10 may also be utilized in a location remote from a source of air under pressure and the pump 60 may be manually operated when needed in order to charge the air chamber 34 with air under pressure. Further, after air under pressure 34 has been introduced into the air chamber 34, the rod 40 may be rotated sufficiently to thread the support member 36 downwardly on the tubular valve body 22 to cause the extension 42 to engage the valve stem 28 and slightly downwardly displace the latter from a fully closed position. In this manner, air from the interior of the pressure chamber 34 may escape, at a controlled rate, through the valve sleeve 32 and the support member or cap 36 via the opening 38 and bubble upwardly through water disposed within the minnow bucket above the bottom wall 20 in order to aerate that water.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A minnow bucket with water aerating means, said bucket including peripherally continuous upstanding side wall portions, rigid upper and lower vertically spaced closure walls extending and sealingly secured across the lower end portions of said side wall portions and defining an upwardly opening water receptacle above said upper closure wall and a closed air-tight chamber between said closure walls, an upstanding tubular valve body supported from and opening through one side marginal portion of said upper closure wall, a valve element shiftably supported centrally within said valve body for movement between lower and upper open and closed limit positions, respectively, a support member threadedly engaged with the upper end of said body and including an abutment portion engageable with said valve element upon downward threading of said support member on said body to variably downwardly displace said element away from its closed limit position toward its open limit position for variably controlling the venting of air from said airtight chamber through said tubular valve body into said receptacle and aerating the water therein, means operative to introduce air under pressure into said chamber, a stationary partial top wall secured over one side portion of the upper end of said bucket in vertical registry with said valve body, said support member being carried by the lower end of a substantially vertical operating rod whose upper end is rotatably received through said partial top wall, and a further top wall portion hingedly supported from said partial top wall swingable into and out of position, in coaction with said partial top wall, to substantially fully close the upper end of said bucket, said upper and lower closure walls being of upright and inverted conical shape, respectively, said support member comprising a downwardly opening internally threaded cap closed at its upper end, the lower end of said operating rod being secured downwardly through the closed upper end of said cap and including a lower terminal end projecting down into the interior of said cap and comprising said abutment portion, said cap including a lateral vent opening formed in one side thereof above said tubular valve body and below the closed upper end of said cap.

2. The combination of claim 1 wherein said means operative to introduce air under pressure into said airtight chamber comprises a hand pump including a horizontal cylindrical body portion secured through one of said side wall portions intermediate said upper and lower closure walls, a piston reciprocal in said body portion, a piston rod portion having one end anchored to said piston and a closed outer end of said cylindrical body portion through which said piston rod portion is slidably received, the outer end of said piston rod portion being operable from the exterior of said bucket and said hand pump cylindrical body portion including a compressed air outlet opening directly into said airtight chamber between said closure walls.

* * * * *